US009820092B1

(12) United States Patent
Fujiwara et al.

(10) Patent No.: US 9,820,092 B1
(45) Date of Patent: Nov. 14, 2017

(54) INFORMATION PROCESSING APPARATUS, POSITIONING SYSTEM AND METHOD FOR POSITIONING A COMMUNICATION DEVICE

(71) Applicant: TOSHIBA TEC KABUSHIKI KAISHA, Shinagawa-ku, Tokyo (JP)

(72) Inventors: Akihiko Fujiwara, Kawasaki Kanagawa (JP); Mika Hirama, Kokubunji Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/463,166

(22) Filed: Mar. 20, 2017

(30) Foreign Application Priority Data

Aug. 19, 2016 (JP) .................. 2016-161504

(51) Int. Cl.
*H04W 24/00* (2009.01)
*H04W 4/02* (2009.01)
*G01S 5/02* (2010.01)

(52) U.S. Cl.
CPC ............. *H04W 4/02* (2013.01); *G01S 5/0252* (2013.01)

(58) Field of Classification Search
CPC ..... H04W 4/02; H04W 64/00; H04W 64/006; H04W 48/18; H04W 16/22; H04W 24/08; H04W 24/10; H04W 4/00

USPC ...... 455/456.1, 456.3, 404.1, 567, 406, 407, 455/412.2, 414.1

See application file for complete search history.

(56) References Cited

U.S. PATENT DOCUMENTS

| 7,751,829 | B2 | 7/2010 | Masuoka et al. |
| 2013/0162821 | A1* | 6/2013 | Park ................. G08B 13/19695 348/143 |
| 2014/0045519 | A1* | 2/2014 | Imafuku ............ H04W 64/006 455/456.1 |

* cited by examiner

*Primary Examiner* — Joseph Arevalo
(74) *Attorney, Agent, or Firm* — Amin, Turocy & Watson LLP

(57) ABSTRACT

An information processing apparatus comprises a recording module; an extraction module which extracts maximum radio wave intensity from the radio wave intensities recorded in the same time zone and extracts the radio wave intensities of other first communication devices arranged in the vicinity of a position where the first communication device with the maximum radio wave intensity is installed; and a positioning module which measures a position of the second communication device based on the plurality of the radio wave intensities extracted by the extraction module, wherein the positioning module determines that the second communication device is present at a position where the first communication device with the maximum radio wave intensity is installed on condition that the maximum radio wave intensity extracted by the extraction module is equal to or greater than a threshold value.

20 Claims, 8 Drawing Sheets

| TRANSMITTER CODE | INSTALLATION POSITION | RECEPTION THRESHOLD VALUE | APPROACH THRESHOLD VALUE | POSITIONING METHOD | GROUP | AREA DIVISION |
|---|---|---|---|---|---|---|
| B00 | 0.0.0 | -80dB | -40dB | TWO-POINT POSITIONING | B01 | FIRST FLOOR |
| B01 | 10.5.0 | -80dB | -40dB | TWO-POINT POSITIONING | B00,B02 | FIRST FLOOR |
| ⋮ | ⋮ | ⋮ | ⋮ | ⋮ | ⋮ | ⋮ |

| RECEIVER CODE | DATE AND TIME INFORMATION | TRANSMITTER CODE | RSSI |
|---|---|---|---|
| R01 | 2016/07/08 14:14:57 | B00 | -38dB |
| | | B01 | -43dB |
| | | B02 | -58dB |
| | | B03 | -65dB |
| | | B04 | -68dB |
| | 2016/07/08 14:14:58 | B00 | -40dB |
| | | B01 | -42dB |
| | | B02 | -38dB |
| | | B03 | -62dB |
| | | B04 | -64dB |
| ⋮ | ⋮ | ⋮ | ⋮ |

| RECEIVER CODE | DATE AND TIME INFORMATION | MEASURED POSITION | LOCATION AREA |
|---|---|---|---|
| R01 | 2016/05/26 11:28:10 | 8.7.10 | FIRST FLOOR |
| | 2016/05/26 11:28:11 | 8.7.11 | FIRST FLOOR |
| ⋮ | ⋮ | ⋮ | ⋮ |

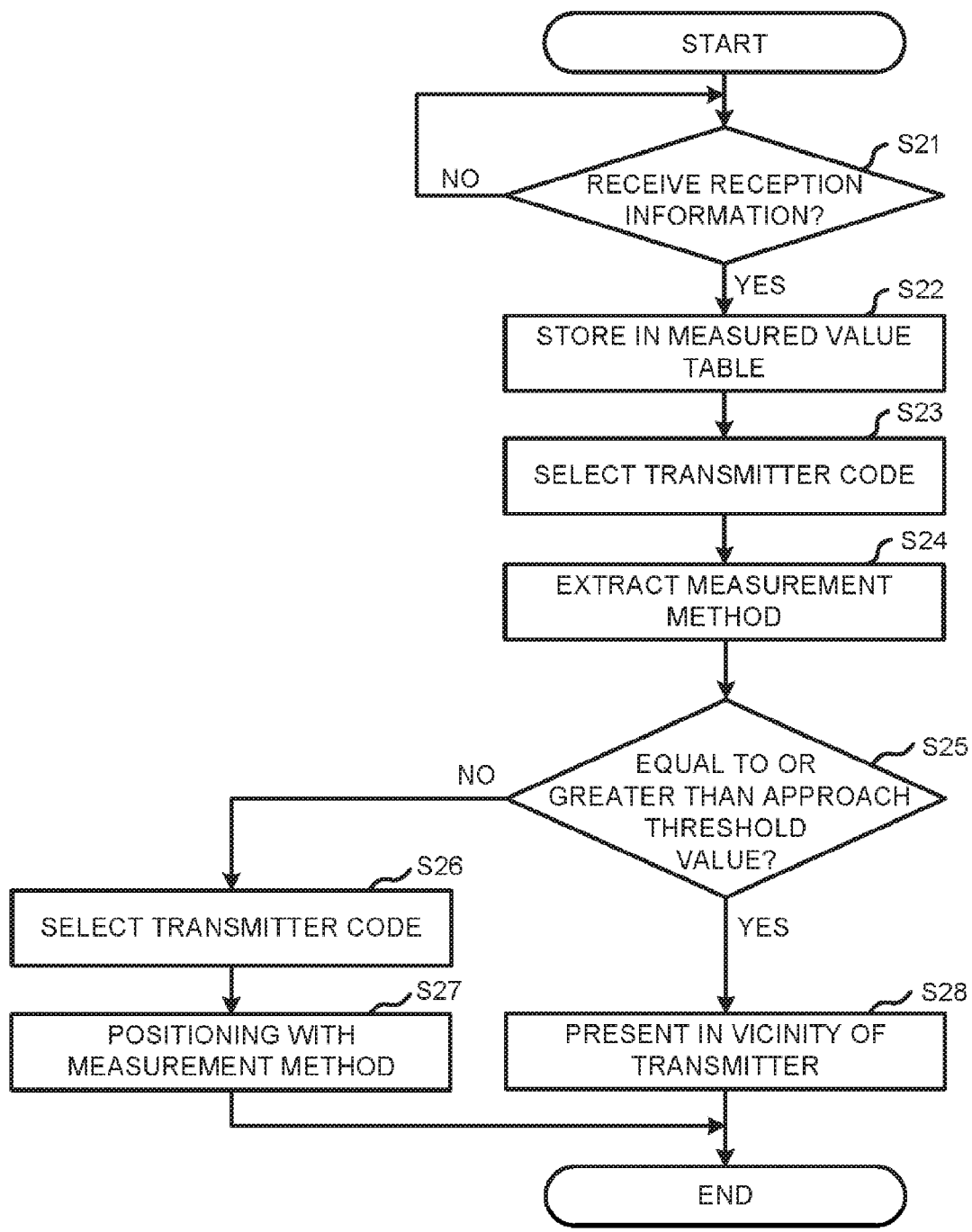

INFORMATION PROCESSING APPARATUS, POSITIONING SYSTEM AND METHOD FOR POSITIONING A COMMUNICATION DEVICE

CROSS-REFERENCE TO RELATED APPLICATIONS

This application is based upon and claims the benefit of priority from Japanese Patent Application No. P2016-161504, filed Aug. 19, 2016, the entire contents of which are incorporated herein by reference.

FIELD

Embodiments described relate generally to an information processing apparatus, a positioning system, and a method for executing accurate positioning.

BACKGROUND

Conventionally, there is known a positioning system using a near distance radio technology. Such a positioning system measures a position of a receiver for receiving a transmitter code based on the transmitter code capable of identifying a transmission transmitted from the transmitter and a radio wave intensity of the transmitted transmitter code. The positioning system executes positioning based on identification information transmitted from a plurality of the transmitters and the radio wave intensities thereof to improve accuracy of the position of the receiver. Further, if the positioning is executed based on the transmitter codes transmitted from the plurality of the transmitters and the radio wave intensities thereof, the positioning system measures the position of the receiver according to a ratio of the radio wave intensities transmitted from the transmitters.

Moreover, the radio wave intensity of the transmitter code transmitted from the transmitter varies due to various factors, and there is a case in which a radio wave intensity stronger than expected is received due to environment in which the transmitter is installed. In such a case, in a conventional positioning system, even if the receiver and the transmitter are present at a substantially the same position, the position of the receiver is measured by containing the transmitter code transmitted from another transmitter and the radio wave intensity thereof. In other words, since the conventional positioning system is strongly influenced by the radio wave intensity in a case in which the radio wave intensity of the transmitter code transmitted from the transmitter that is not located nearby is stronger than expected, the position of the receiver cannot be accurately measured.

DESCRIPTION OF THE DRAWINGS

FIG. 11 is a flowchart illustrating an example of a positioning processing.

DETAILED DESCRIPTION

In accordance with an embodiment, an information processing apparatus comprises a recording module, an extraction module and a positioning module. The recording module records radio wave intensities of a near distance radio communication between a plurality of first communication devices installed in an area for positioning an object and a second communication device moving in the area in each time zone. The extraction module extracts maximum radio wave intensity from the radio wave intensities recorded in the same time zone and extracts radio wave intensities of other first communication devices arranged in the vicinity of a position where the first communication device with the maximum radio wave intensity is installed. The positioning module measures a position of the second communication device based on the plurality of the radio wave intensities extracted by the extraction module. The positioning module determines that the second communication device is present at a position where the first communication device with the maximum radio wave intensity is installed on condition that the maximum radio wave intensity extracted by the extraction module is equal to or greater than a threshold value.

Hereinafter, an information processing apparatus, a positioning system and a method for executing accurate positioning relating to the embodiment are described in detail with reference to the accompanying drawings. The embodiment described in the following is an embodiment of the information processing apparatus, the positioning system, and the method for executing accurate positioning; and is not intended to limit the constitution and specification thereof.

Figure 1:
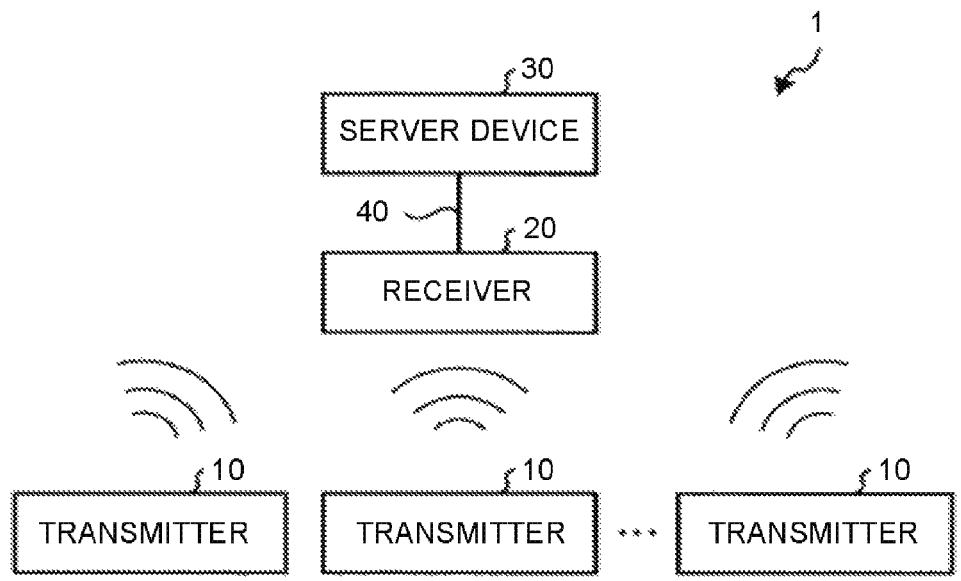
FIG. 1 is a view illustrating an example of a positioning system according to an embodiment.

FIG. 1 is a view illustrating an example of a positioning system 1 according to an embodiment. The positioning system 1 includes one or a plurality of transmitters 10, a receiver 20 and a server device 30. The receiver 20 and the server device 30 are connected in a communicable manner via a network 40 such as an internet, a VPN (Virtual Private Network), a LAN (Local Area Network) and the like.

The transmitter 10 corresponds to a first communication device of the present embodiment. The transmitter 10 transmits a transmitter code as identification information capable of identifying the transmitter 10 itself through a near distance radio communication such as a BLE (Bluetooth® Technology Low Energy). The transmitters 10 are installed at positions which are main positions for position detection in an area of a facility into which the positioning system 1 is introduced.

The receiver 20 is a portable second communication device which is a positioning target such as a smart phone. The receiver 20 receives a transmitter code transmitted from the transmitter 10. The receiver 20 transmits reception information to the server device 30 on condition that the transmitter code transmitted from the transmitter 10 is received. The reception information is used to notify that the transmitter code is received from the transmitter 10. The reception information contains a receiver code, date and time information, the transmitter code and a reception radio wave intensity. The receiver code is identification information capable of identifying the receiver 20. In other words, the receiver code indicates the receiver 20 which is a sending source of the reception information. The date and time information indicates date and time at which the receiver 20 receives the transmitter code from the transmitter 10. The date and time information may indicate a time zone. The transmitter code is received by the receiver 20 from the transmitter 10. The reception radio wave intensity is a radio wave intensity in the near distance radio communication between the transmitter 10 and the receiver 20. More specifically, the reception radio wave intensity is the radio wave intensity (hereinafter, referred to as a RSSI (Received Signal Strength Indicator)) at the time the receiver 20 receives the transmitter code from the transmitter 10.

The server device 30 corresponds to an information processing apparatus of the present embodiment. The server device 30 measures the position where the receiver 20 is present based on the reception information transmitted from the receiver 20. The server device 30 displays a screen on which a moving route of the receiver 20 is shown. The server device 30 may be composed of a single device or a plurality of devices.

The outline of a positioning method in the positioning system 1 is described.

The transmitter 10 transmits the transmitter code to an unspecified receiver 20. The receiver 20 transmits the reception information corresponding to each transmitter code to the server device 30 in a case in which the transmitter codes are received from one or a plurality of the transmitters 10.

The server device 30 measures the position of the receiver 20 by any one of a one-point positioning, a two-point positioning and a three-point positioning based on preset setting in a case of receiving the reception information. In a case of the one-point positioning, the server device 30 determines that there is the receiver 20 at a position at a distance calculated based on the RSSI from the installation position of the transmitter 10 with the received transmitter code.

In a case of the two-point positioning, the server device 30 measures the position of the receiver 20 based on the installation positions of the transmitters 10 respectively having received two transmitter codes and a ratio of the RSSIs of the transmitter codes. More specifically, the server device 30 calculates the distance by taking the ratio of the RSSIs received from the transmitters 10 as a ratio of distances from the receiver 20 to the transmitters 10. For example, a distance between a transmitter A and a transmitter B is set to 10 m. In this case, the RSSI of the transmitter code received from the transmitter A is −50 dB, and the RSSI of the transmitter code received from the transmitter B is −50 dB. In this case, the server device 30 determines that there is the receiver 20 at a distance of 5 m away from the transmitter A and 5 m away from the transmitter B.

In a case of the three-point positioning, the server device measures the position of the receiver 20 based on the installation positions of the transmitters 10 having the three transmitter codes received and distances calculated based on the RSSIs of the transmitter codes. More specifically, the server device 30 calculates the distance from each transmitter 10 to the receiver 20 based on the RSSI of the transmitter code received from each transmitter 10. The server device 30 determines that there is the receiver 20 at a position satisfying the distance from each transmitter 10. For example, a case of executing the three-point positioning based on the RSSIs of the transmitter codes respectively received from a transmitter C, a transmitter D and a transmitter E is described as an example. The distance from the transmitter 10 to the receiver 20 calculated based on the RSSI is 3 m in a case of the transmitter C, 4 m in a case of the transmitter D, and 5 m in a case of the transmitter E. In this case, the server device 30 determines that there is the receiver 20 at a distance of 3 m away from the transmitter C, 4m away from the transmitter D and 5 m away from the transmitter E. Further, the three-point positioning is not limited to a case in which there are three transmitters 10 and can be executed even in a case in which there are four or more transmitters 10.

The hardware constitution of each device in the positioning system 1 according to the present embodiment is described.

Figure 2:
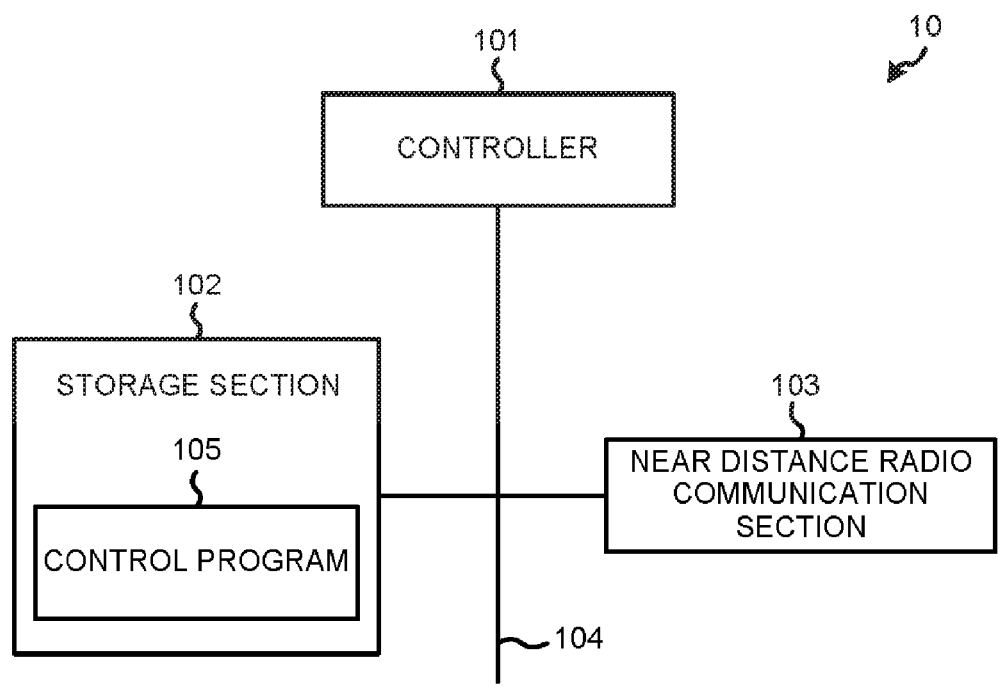
FIG. 2 is a block diagram illustrating an example of the hardware constitution of a transmitter.

FIG. 2 is a block diagram illustrating an example of the hardware constitution of the transmitter 10. The transmitter 10 includes a controller 101, a storage section 102 and a near distance radio communication section 103. The controller 101, the storage section 102 and the near distance radio communication section 103 are mutually connected via a system bus 104.

The controller 101 controls the overall operation of the transmitter 10 to realize various functions of the transmitter 10. The controller 101 includes a CPU (Central Processing Unit), a ROM (Read Only Memory) and a RAM (Random Access Memory). The CPU collectively controls the operation of the transmitter 10. The ROM stores various programs and data. The RAM temporarily stores various programs and rewrites various data. The CPU executes a program stored in the ROM or the storage section 102 by using the RAM as a work area (working area).

The storage section 102 is a non-volatile storage device such as a flash memory. The storage section 102 stores a control program 105. The control program 105 is an operating system or a program for exercising the function of the transmitter 10. The control program 105 includes a program for exercising characteristic functions according to the present embodiment.

The near distance radio communication section 103 transmits the transmitter code to the unspecified receiver 20 with the near distance radio communication such as BLE.

Figure 3:
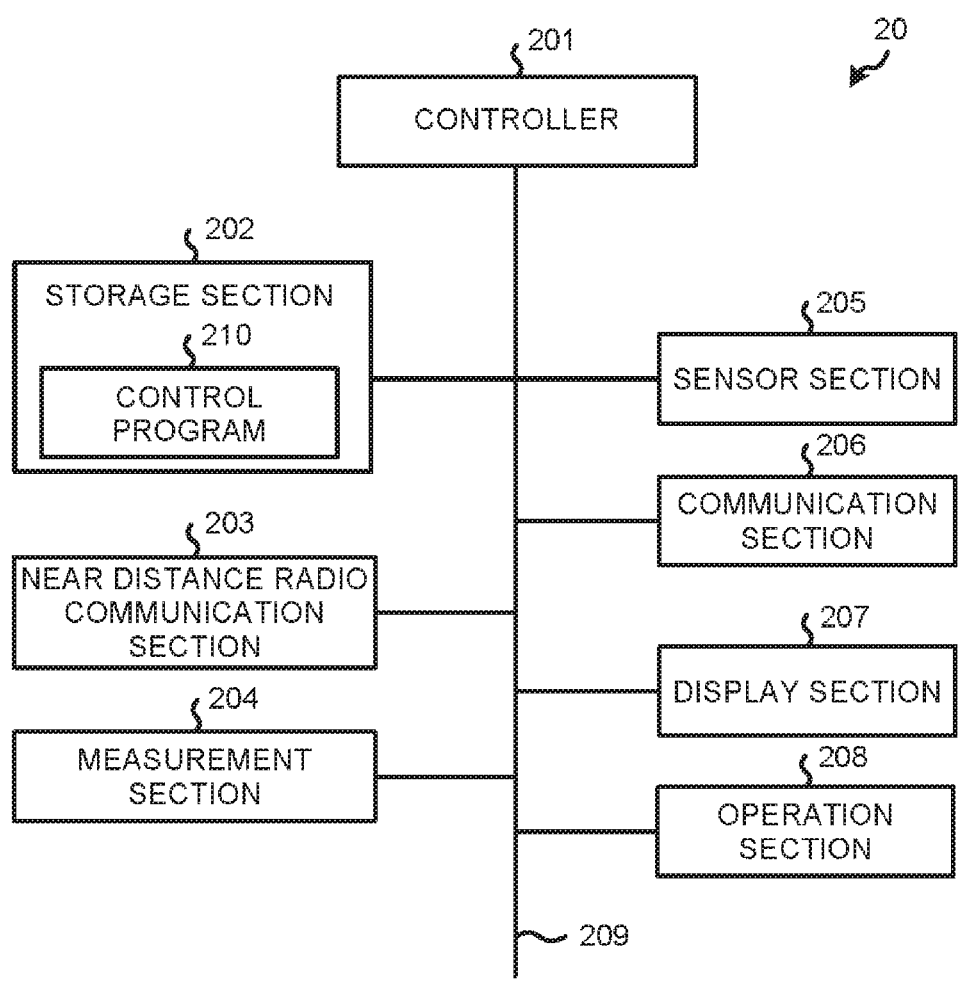
FIG. 3 is a block diagram illustrating an example of the hardware constitution of a receiver.

FIG. 3 is a block diagram illustrating an example of the hardware constitution of the receiver 20. The receiver 20 includes a controller 201, a storage section 202, a near distance radio communication section 203, a measurement section 204, a sensor section 205, a communication section 206, a display section 207 and an operation section 208. The controller 201, the storage section 202, the near distance radio communication section 203, the measurement section 204, the sensor section 205, the communication section 206, the display section 207 and the operation section 208 are connected to each other via a system bus 209.

The controller 201 controls the overall operation of the receiver 20 to realize various functions of the receiver 20. The controller 201 includes a CPU, a ROM and a RAM. The CPU collectively controls the operation of the receiver 20. The ROM stores various programs and data. The RAM temporarily stores various programs and rewrites various data. The CPU executes a program stored in the ROM or the storage section 202 by using the RAM as a work area (working area).

The storage section 202 is a non-volatile storage device such as a flash memory, an HDD (Hard Disk Drive) or an SSD (Solid State Drive). The storage section 202 stores a control program 210. The control program 210 is an operating system or a program for exercising the function of the receiver 20. The control program 210 includes a program for exercising characteristic functions according to the present embodiment.

The near distance radio communication section 203 receives the transmitter code transmitted from the transmitter 10 with the near distance radio communication such as the BLE.

The measurement section 204 is an electronic circuit for measuring the RSSI of the transmitter code received by the near distance radio communication section 203.

The sensor section 205 is a sensor for detecting movement of the receiver 20. For example, the sensor section 205 is an acceleration sensor, an angular velocity sensor, a magnetic sensor or the like.

The communication section 206 is an interface for communicating with the server device 30 via the network 40.

The display section 207 is a liquid crystal display device (LCD). The display section 207 is not limited to the liquid crystal display device, and may be an organic EL display device. The operation section 208 is a touch panel laminated on the display section 207. The operation section 208 is not limited to the touch panel, and may be a hardware switch or the like.

Figures 4, 5:
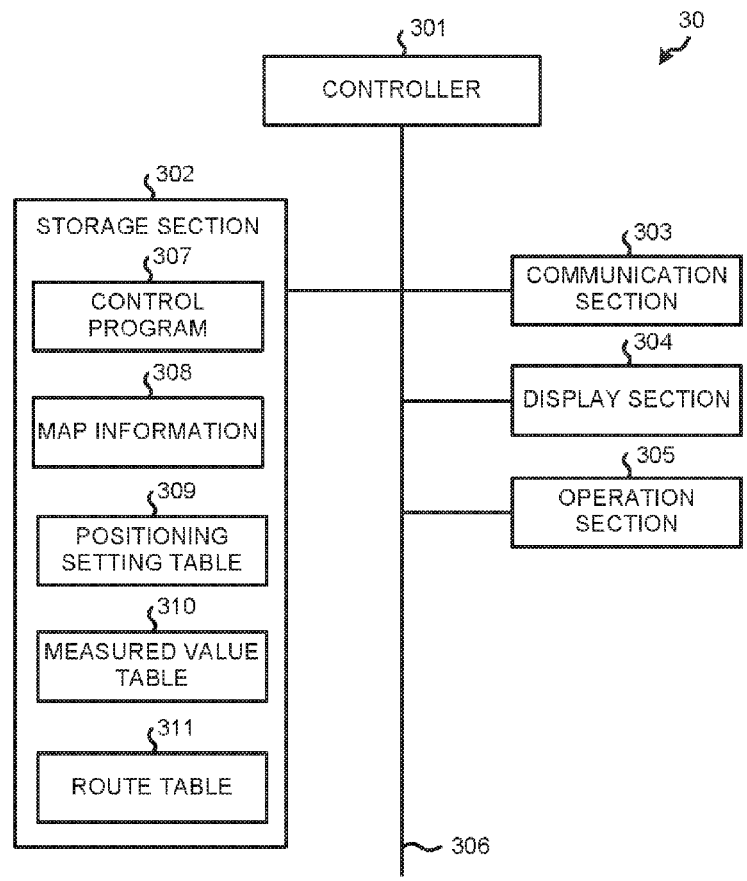
FIG. 4 is a block diagram illustrating an example of the hardware constitution of a server device.
FIG. 5 is a view illustrating an example of the data constitution of a positioning setting table.

FIG. 4 is a block diagram illustrating an example of the hardware constitution of the server device 30. The server device 30 includes a controller 301, a storage section 302, a communication section 303, a display section 304 and an operation section 305. The controller 301, the storage section 302, the communication section 303, the display section 304 and the operation section 305 are connected to each other via a system bus 306.

The controller 301 controls the overall operation of the server device 30 to realize various functions of the server device 30. The controller 301 includes a CPU, a ROM and a RAM. The CPU collectively controls the operation of the server device 30. The ROM stores various programs and data. The RAM temporarily stores various programs and rewrites various data. The CPU executes a program stored in the ROM or the storage section 302 by using the RAM as a work area (working area).

The storage section 302 is a non-volatile storage device such as an HDD or an SSD. The storage section 302 stores a control program 307, map information 308, a positioning setting table 309, a measured value table 310 and a route table 311. The map information 308, the positioning setting table 309, the measured value table 310 and the route table 311 are not limited to being stored in the server device 30, and may be stored in other devices such as the receiver 20.

The control program 307 is an operating system or a program for exercising the function of the server device 30. The control program 307 includes a program for exercising characteristic functions according to the present embodiment.

The map information 308 indicates a map in a range in which the receiver 20 can be positioned in the positioning system 1.

FIG. 5 is a view illustrating an example of the data constitution of the positioning setting table 309. The positioning setting table 309 is a data table for storing various setting relating to positioning of the receiver 20 by each the transmitter code. The positioning setting table 309 stores a transmitter code, an installation position, a reception threshold value, an approach threshold value, a positioning method, a group and an area division in an associated manner.

The transmitter code indicates a transmitter code which is an object. The installation position indicates a position where the transmitter 10 transmitting the transmitter code is installed. For example, the installation position is a coordinate indicating the position in the map information 308. Alternatively, the installation position may indicate latitude and longitude. The reception threshold value is a lower limit threshold value of the RSSI used in the positioning. The approach threshold value is an upper limit threshold value of the RSSI used in the positioning. The positioning method indicates setting of the positioning method. For example, the positioning method may be set to any one of the one-point positioning, the two-point positioning and the three-point positioning. Further, the positioning method is set according to a position where the transmitter 10 is installed. For example, the one-point positioning or the two-point positioning is preferable if it is not necessary to measure where the receiver 20 is present in a road width direction of a straight road of which the road width is narrow. The transmitter code of the transmitter 10 which is a comparison object of the RSSI is set in the group in a case of two-point measurement or three-point measurement. In a case of executing the two-point measurement or the three-point measurement, the transmitter 10 used to be compared with the RSSI is selected from the group. Which one of transmitter codes is set in the group is optional; however, for example, the transmitter code of the transmitter 10 installed in the vicinity of the position where the transmitter 10 with the object transmitter code is installed is set. The transmitter 10 arranged in the vicinity of the position is, for example, an adjacent transmitter 10. The area division is information for designating the area in which the receiver 20 is positioned. For example, the area division is the designation of a stair number such as a first floor, a second floor and the like. If the position where the transmitter 10 is installed is a boundary part between the adjacent areas, information indicating that the position is the boundary part between the areas is set in the area division. In this case, the RSSI of the transmitter code of the transmitter 10 located in other areas set in the group is also the positioning object.

Figure 6:
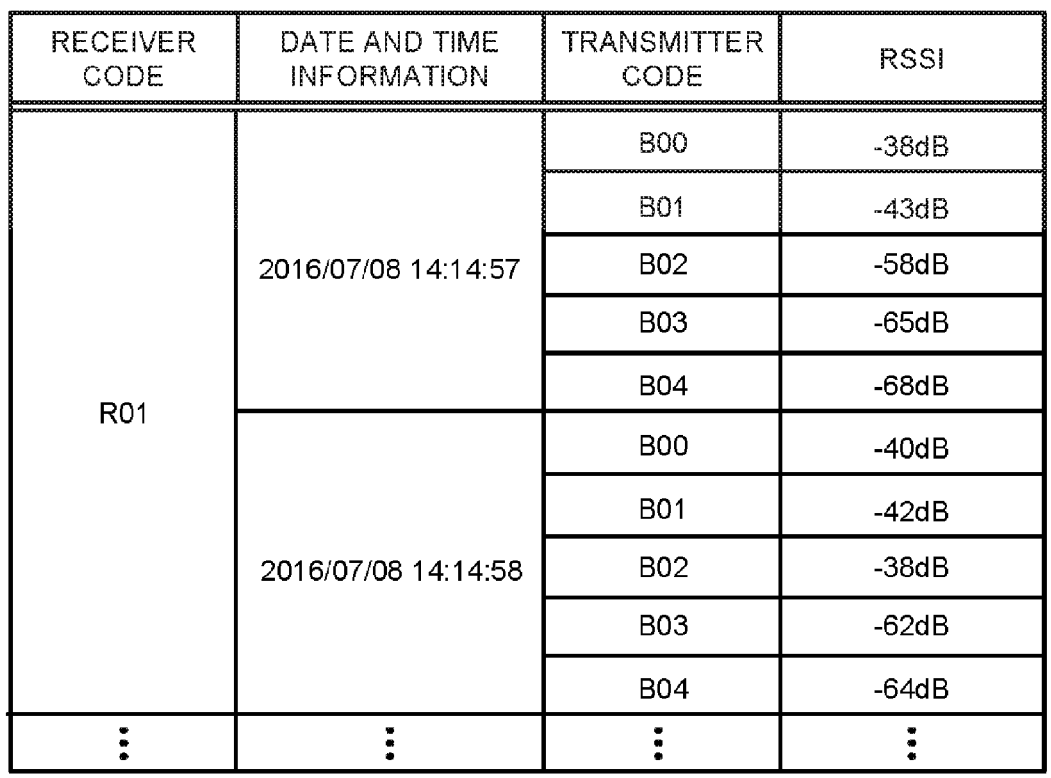
FIG. 6 is a view illustrating an example of the data constitution of a measured value table.

FIG. 6 is a view illustrating an example of the data constitution of the measured value table 310. The measured value table 310 is a data table in which the RSSIs of the transmitter codes received by the receiver 20 are recorded in a chronological order. The measured value table 310 stores the receiver code, date and time information, the transmitter code and the RSSI in an associated manner. The receiver code is the identification information capable of identifying the receiver 20 which receives the transmitter code. The date and time information indicates date and time at which the transmitter code is received. The date and time may indicate a time zone. For example, if the date and time information is "2016/07/08 14: 14: 57", the date and time information may indicate a time zone of "2016/07/08 14: 14: 57: 00~2016/07/08 14: 14: 57: 59". The transmitter code indicates the received transmitter code. The RSSI indicates a value of the RSSI of the received transmitter code.

Figure 7:
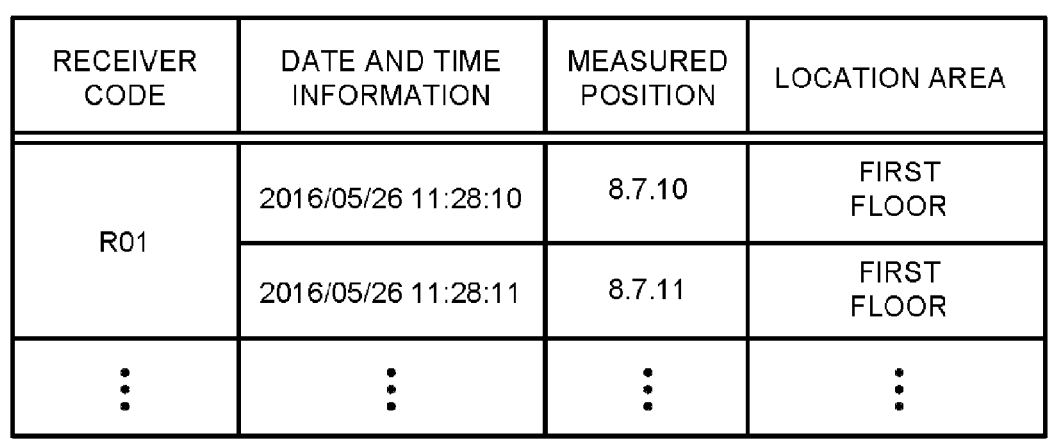
FIG. 7 is a view illustrating an example of the data constitution of a route table.

FIG. 7 is a view illustrating an example of the data constitution of the route table 311. The route table 311 is data table in which a route of the receiver 20 poisoned by the positioning system 1 is stored. In other words, the route table 311 stores the position of the receiver 20 positioned by the positioning system 1 in a chronological order. The route table 311 stores the receiver code, date and time information, a measured position and a location area in an associated manner. The receiver code indicates the receiver 20 to be positioned. The date and time information indicates date and time at which the receiver 20 is positioned. The date and time information may indicate a time zone. The measured position indicates the position of the receiver 20 at the date and time at which the receiver 20 is positioned. The location area indicates an area in which the receiver 20 is located at the date and time of the positioning. For example, the area indicates the stair number such as a first floor, a second floor and the like.

The communication section 303 is an interface for communicating with the receiver 20 via the network 40.

The display section 304 is a liquid crystal display device (LCD). The display section 304 is not limited to the liquid crystal display device, and may be an organic EL display device.

The operation section 305 is an input device such as a keyboard, a mouse or the like. The operation section 305 receives an operation on the server device 30.

Figure 8:
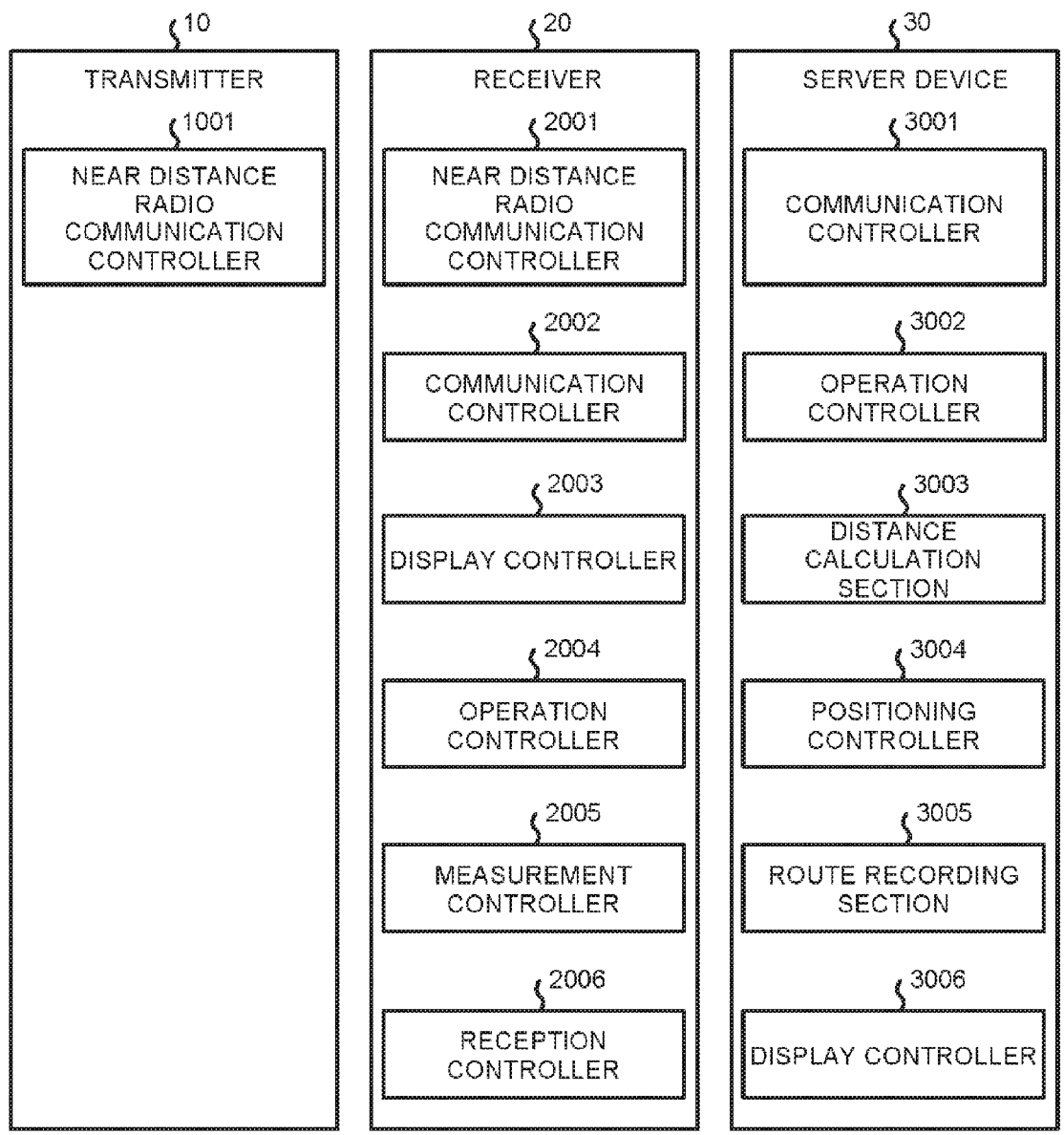
FIG. 8 is a block diagram illustrating characteristic functional components of each device in the positioning system.

Characteristic functions of each device of the positioning system 1 according to the present embodiment are described. FIG. 8 is a block diagram illustrating characteristic functional components of each device in the positioning system 1.

The controller 101 of the transmitter 10 copies or decompresses the control program 105 stored in the storage section 102 on the RAM and operates according to the control program 105 to generate each functional section shown in FIG. 8 in the RAM. Specifically, the controller 101 of the transmitter 10 includes a near distance radio communication controller 1001 as the functional section.

The near distance radio communication controller 1001 controls the near distance radio communication section 103 to transmit the transmitter code which is the identification information capable of identifying the transmitter 10. Further, the near distance radio communication controller 1001 may change the radio wave intensity of the transmitter code to be transmitted according to the setting. The near distance radio communication controller 1001 transmits the transmitter code with stronger radio wave intensity in a case in which there is a radio wave absorber near the transmitter 10, and in this way, the receiver 20 can receive the transmitter code with the proper radio wave intensity.

The controller 201 of the receiver 20 copies or decompresses the control program 210 stored in the storage section 202 on the RAM and operates according to the control program 210 to generate each functional section shown in FIG. 8 in the RAM. Specifically, the controller 201 of the receiver 20 includes a near distance radio communication controller 2001, a communication controller 2002, a display controller 2003, an operation controller 2004 and a reception controller 2006.

The near distance radio communication controller 2001 controls the near distance radio communication section 203 to receive the transmitter code transmitted from the transmitter 10.

The communication controller 2002 controls the communication section 206 to communicate with the server device 30. The display controller 2003 controls the display section 207 to display various screens.

The operation controller 2004 controls the operation section 208 to receive various devices. Further, the operation controller 2004 may receive various devices via a gesture instead of the operation section 208. This case can be realized as long as the sensor section 205 includes a motion sensor for detecting a gesture. The operation controller 2004 may control the motion sensor to receive various devices.

The measurement controller 2005 controls the measurement section 204 to measure the RSSI of the transmitter code received by the near distance radio communication section 203.

The reception controller 2006 controls the reception of the transmitter code by the near distance radio communication controller 2001. More specifically, the reception controller 2006 starts the reception of the transmitter code on condition that a positioning start request for starting the positioning of the receiver 20 is input. Further, the positioning start request may be information received by the communication controller 2002 from the server device 30 or an operation received by the operation controller 2004. The reception controller 2006 requests setting information in which various settings relating to the positioning as preparation of the positioning of the receiver 20 are shown on condition that the positioning start request is input. In other words, the reception controller 2006 transmits a transmission request of the setting information in the positioning setting table 309 and the like to the communication controller 2002. The reception controller 2006 changes a mode from a standby mode to a scanning mode on condition that the communication controller 2002 receives the setting information in the positioning setting table 309 and the like. The standby mode is a mode for waiting for the reception of the transmitter code transmitted from the transmitter 10. The scanning mode is a mode for receiving the transmitter code transmitted from the transmitter 10.

The reception controller 2006 enables the measurement controller 2005 to measure the RSSI of the received transmitter code on condition that the near distance radio communication controller 2001 receives the transmitter code in the scanning mode. Herein, the RSSI of the near distance radio communication is easily affected by reflection by walls, attenuation by an absorber and the like. In other words, there is a case in which the measurement controller 2005 measures the RSSI with an abnormal value due to various factors. In this way, if the RSSI with the abnormal value is contained in the measurement result, the positioning cannot be accurately executed.

Thus, the reception controller 2006 determines whether or not the RSSI is normal, in other words, whether or not the received transmitter code can be adopted based on the measured RSSI. Herein, the determination method of the RSSI can use various methods. For example, the reception controller 2006 determines whether or not the RSSI of the received transmitter code is equal to or greater than the reception threshold value in the positioning setting table 309. The reception controller 2006 determines that the RSSI is normal if the RSSI is equal to or greater than the reception threshold value. On the other hand, the reception controller 2006 determines that the RSSI is abnormal if the RSSI is smaller than the reception threshold value.

The reception controller 2006 determines whether or not the RSSI can be adopted according to a statistical method. The reception controller 2006 determines whether or not the RSSI is normal according to whether variation is within an allowable range by using a median, an average value or variance in statistics in three unit times. The reception controller 2006 enables the communication controller 2002 to transmit the reception information towards the server device 30 on condition that the RSSI is normal.

The controller 301 of the server device 30 copies or decompresses the control program 307 stored in the storage section 302 on the RAM and operates according to the control program 307 to generate each functional section shown in FIG. 8 in the RAM. Specifically, the controller 301 of the server device 30 includes a communication controller 3001, an operation controller 3002, a distance calculation section 3003, a positioning controller 3004, a route recording section 3005 and a display controller 3006.

The communication controller 3001 controls the communication section 303 to communicate with the receiver 20.

The operation controller 3002 controls the operation section 305 to receive various devices.

The distance calculation section 3003 calculates a distance from the transmitter 10 to the receiver 20 based on the RSSI of the transmitter code transmitted by the transmitter 10. The distance calculation section 3003 calculates the distance from the transmitter 10 to the receiver 20 by using the RSSI according to an equation (1).

$$RSSI(r)=A-10*B/\log 10(r) \tag{1}$$

Wherein, r indicates the distance from the transmitter 10 to the receiver 20.

A indicates the value of the RSSI in a case of measuring the radio wave of the transmitter 10 at a distance of 1 m away.

B indicates a constant of attenuation of the radio wave, and is theoretically 2.

The positioning controller 3004 functions as a recording module, an extraction module and a positioning module of the present embodiment. The positioning controller 3004 controls the positioning of the receiver 20. More specifically, the positioning controller 3004 records the RSSI by each transmitter code in association with the receiver code and the date and time information contained in the reception information on condition that the communication controller 3001 receives the reception information.

The positioning controller 3004 extracts the RSSI suitable to the positioning from the RSSI of the transmitter code received at the date and time which is the positioning object from the measured value table 310 in the positioning of the receiver 20. More specifically, the positioning controller 3004 extracts the transmitter code with the highest RSSI at the same date and time information in the measured value table 310. The positioning controller 3004 extracts the positioning method of the extracted transmitter code from the positioning setting table 309. If the positioning method is the one-point positioning, the positioning controller 3004 measures the position of the receiver 20 based on the installation position of the transmitter with the extracted transmitter code and the distance calculated by the distance calculation section 3003 from the RSSI of the extracted transmitter code.

If the positioning method is the two-point positioning or the three-point positioning, the positioning controller 3004 selects a plurality of the transmitters 10 corresponding to the positioning method of the extracted transmitter code from the group in the positioning setting table 309. In other words, the positioning controller 3004 extracts the RSSIs of the transmitter codes transmitted from the selected plural transmitters 10. If the positioning method is the two-point positioning, the positioning controller 3004 extracts the transmitter code with the highest RSSI other than the transmitter code extracted in the same date and time information from the group of the measured value table 310. The positioning controller 3004 measures the position of the receiver 20 according to the installation positions where the two extracted transmitter 10 are installed and a ratio of the RSSIs of the transmitter codes received from the two extracted transmitters 10.

On the other hand, if the positioning method is the three-point positioning, the positioning controller 3004 extracts upper two of the transmitter codes with high RSSI values other than the transmitter code extracted in the same date and time information from the group of the measured value table 310. The positioning controller 3004 measures the position of the receiver 20 according to the installation position indicating the position where the extracted three transmitters 10 are installed and each distance from each transmitter 10 calculated based on each transmitter code received from each of the extracted three transmitters 10.

The positioning controller 3004 calculates each distance from each transmitter 10 to the receiver 20 based on each of the RSSIs of the transmitter codes received from a plurality of the transmitters 10 in a case of the two-point positioning and the three-point positioning. Thus, the positioning controller 3004 contains the RSSIs of the transmitter codes received from other transmitters 10 in the calculation object of the position of the receiver 20 even if there is the receiver 20 in the vicinity of the position where the transmitter 10 identified by the transmitter code with the highest RSSI is installed. Thus, due to the RSSIs of the transmitter codes received from other transmitters 10, there is a case in which the positioning controller 3004 cannot determine that there is the receiver 20 in the vicinity of the position where the transmitter 10 identified by the transmitter code with the highest RSSI is installed. Thus, the positioning controller 3004 determines that there is the receiver 20 at the position of the transmitter 10 identified by the transmitter code on condition that the RSSI of the transmitter code is equal to or greater than the approach threshold value of the positioning setting table 309 even if the two-point positioning and the three-point positioning are used.

The positioning controller 3004 may determine that there is the receiver 20 at the position where the transmitter 10 identified by the transmitter code with high RSSI is installed on condition that the ratio of the RSSIs of the plural transmitter codes that are extracted is equal to or greater than the threshold value. For example, the positioning controller 3004 determines that there is the receiver 20 in the vicinity of the position where the transmitter 10 identified by the transmitter code with high RSSI is installed on condition that the RSSI of the transmitter code transmitted from one transmitter 10 is remarkably higher than the RSSIs of the transmitter codes transmitted from other transmitters 10.

It is preferable that the positioning controller 3004 prevents the positioning of the receiver 20 based on the RSSI of the transmitter code transmitted from the transmitter 10 located beyond the object area. For example, although the receiver 20 is located at the first floor, if the positioning is executed by using the RSSI of the transmitter code transmitted from the transmitter 10 located at the second floor, the accurate position of the receiver 20 can be measured. Thus, the positioning controller 3004 excludes the RSSI of the transmitter code transmitted from the transmitter 10 located beyond the object area from the positioning object. Specifically, the positioning controller 3004 excludes the transmitter code of which the area division last time recorded in the chronological order in the positioning setting table 309 is different from the location area thereof in the route table 311 at the time of extracting the transmitter code from the measured value table 310.

However, the positioning controller 3004 extracts the RSSI of the transmitter code of the transmitter 10 located in the area where the transmitter 10 identified by the transmitter code with the highest RSSI is not installed in a case in which the area division of the positioning setting table 309 indicates the boundary part between the areas. Specifically, the positioning controller 3004 extracts the RSSI of the transmitter code transmitted from the transmitter 10 located in other areas set in the group of the positioning setting table 309. The positioning controller 3004 measures the position of the receiver 20 with the two-point positioning or the three-point positioning by using extracted RSSI.

The route recording section 3005 stores information relating to the position of the receiver 20 measured by the positioning controller 3004 in the route table 311 in a chronological order. In other words, the route recording section 3005 records the measured position and the location area by each date and time of the receiver 20 positioned by the positioning controller 3004 in the route table 311 in the chronological order. Thus, the route recording section 3005 derives the route in which the receiver 20 moves.

Figure 9:
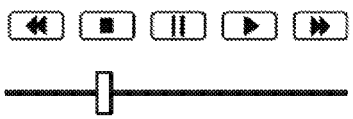
FIG. 9 is a view illustrating an example of a GUI screen for operating the positioning system.

The display controller 3006 controls the display section 304 to display various screens. For example, the display controller 3006 displays a GUI (Graphical User Interface) screen for displaying the positioning system 1 on the display section 304. FIG. 9 is a view illustrating an example of a GUI screen 3100 for operating the positioning system 1. The GUI screen 3100 includes a mode selection area 3110, an object date and time display area 3120, a display operation area 3130, a setting display area 3140, a moving route display area 3150 and a setting operation area 3160.

The mode selection area 3110 is an area for selecting a mode. The mode includes a real time mode and a simulation mode. The real time mode is a mode for sequentially displaying the reception information transmitted from the receiver 20. The simulation mode is a mode for displaying the reception information transmitted in the past from the receiver 20. The simulation mode includes an execution mode and a recalculation execution mode. The execution mode is used to call the positioning result that is calculated based on the RSSI received in the past to display the screen. The recalculation execution mode is a mode of recalculating the position of the receiver 20 by using the setting value changed in the setting display area 3140 to display the updated location area.

The object date and time display area 3120 is an area for displaying object date and time in the simulation mode. The display operation area 3130 is an area in which an operator for operating the display of a positioning result in the moving route display area 315 is displayed. Operators for inputting operations such as "playback", "stop", "pause", "rewind" "fast forward", "playback speed", "time bar" and "recalculate" are displayed in the display operation area 3130. The "playback" is an operator for displaying the positioning result in a chronological order. The "stop" is an operator for stopping the display of the positioning result in the chronological order. The "pause" is an operator for temporarily stopping the display of the measurement result in the chronological order. The "rewind" is an operator for displaying the positioning result in the chronological order. The "fast forward" is an operator for displaying the positioning result in the chronological order at a predetermined double speed. The "playback speed" is an operator for displaying the positioning result in the chronological order at a double speed of a selected number. The "time bar" is an operator for displaying an optional positioning result. The "recalculate" is an operator for recalculating the positioning of the receiver 20 based on the setting value displayed in the setting display area 3140.

The setting display area 3140 is an area for displaying various settings relating to the positioning of the receiver 20 for each transmitter code. In other words, the setting display area 3140 is an area for displaying various settings stored in the positioning setting table 309. The user can change setting values of various settings in the setting display area 3140. The moving route display area 3150 is overlaid on the map information 308 and is an area for displaying the positioning result of the receiver 20 stored in the route table 311 in the chronological order. In the moving route display area 3150, the transmitter 10 is represented by an outlined circle. The transmitter code is displayed at the inner side of the outlined cycle. On the other hand, the receiver 20 is indicated by a black circle. The setting operation area 3160 is an area in which an operator for operating the setting displayed in the setting display area 3140 is displayed. Operators for inputting "save" and "set to the transmitter" are displayed in the setting operation area 3160. The "Save" is an operator for saving the setting in the setting display area 3140 in the storage section 302 and the like. The "Set to the transmitter" is an operator for setting the setting in the setting display area 3140 to the receiver 20.

Figure 10:
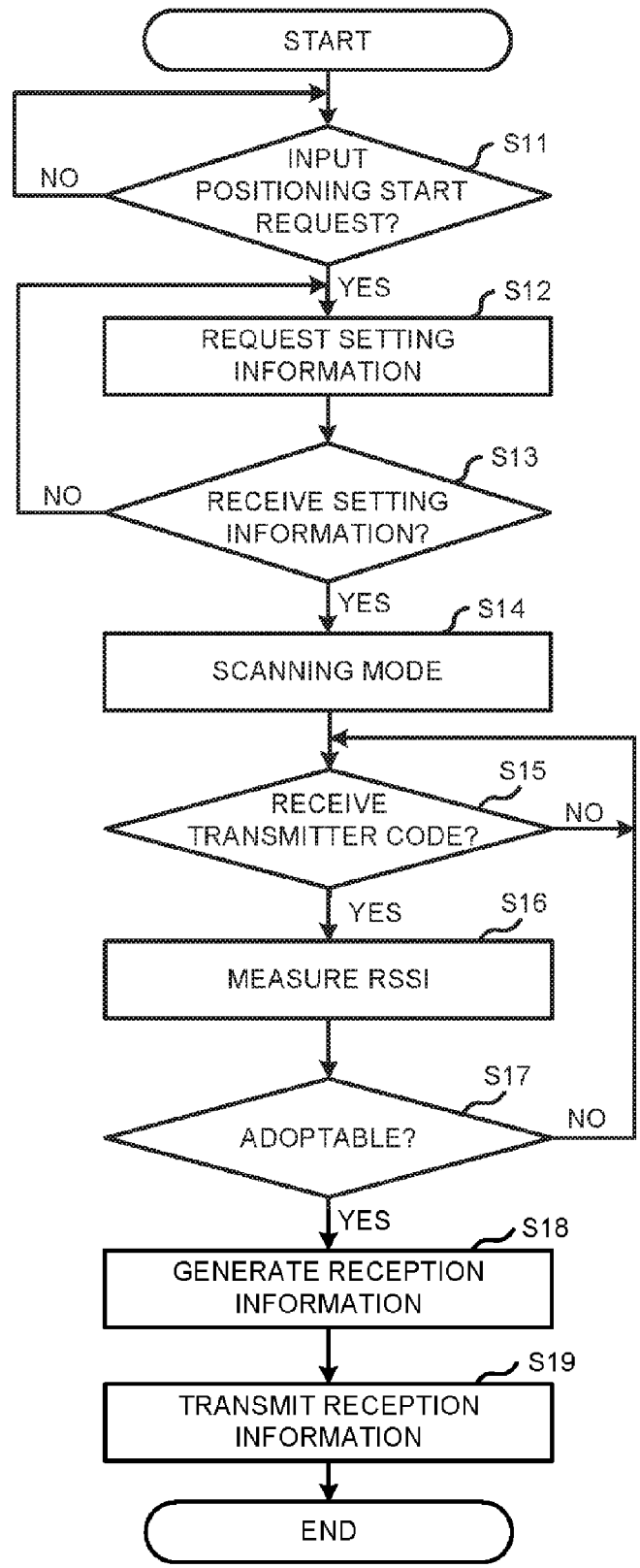
FIG. 10 is a flowchart illustrating an example of a reception processing.

Next, a reception processing executed by the receiver 20 in the positioning system 1 according to the embodiment is described. FIG. 10 is a flowchart illustrating an example of the reception processing executed by the receiver 20 in the positioning system 1 according to the embodiment.

The reception controller 2006 determines whether or not the positioning start request for starting the positioning of the receiver 20 is input (Act S11). If the positioning start request is not input (No in Act S11), the receiver 20 stands by until the positioning start request is satisfied.

On the other hand, if the positioning start request is input (Yes in Act S11), the communication controller 2002 transmits a transmission request of the setting information in the positioning setting table 309 to the server device 30 (Act S12). The communication controller 2002 determines whether or not the setting information in the positioning setting table 309 is received (Act S13). If the setting information in the positioning setting table 309 is not received (No in Act S13), the receiver 20 stands by until the setting information in the positioning setting table 309 is received.

On the other hand, if the positioning setting table 309 is received (Yes in Act S13), the reception controller 2006 sets the mode to the scanning mode for receiving the transmitter code transmitted from the transmitter 10 (Act S14).

The near distance radio communication controller 2001 determines whether or not the transmitter code is received (Act S15). If the transmitter code is not received (No in Act S15), the receiver 20 stands by until the transmitter code is received.

If the transmitter code is received (Yes in Act S15), the measurement controller 2005 measures the RSSI of the received transmitter code (Act S16).

The reception controller 2006 determines whether or not the received transmitter code can be adopted as the positioning object according to the RSSI (Act S17). If the transmitter code cannot be adopted (No in Act S17), the receiver 20 proceeds to the processing in Act S15.

On the other hand, if the transmitter can be adopted (Yes in Act S17), the reception controller 2006 generates the reception information (Act S18). The communication controller 2002 of the receiver 20 transmits the generated reception information to the server device 30 (Act S19).

In this way, the receiver 20 terminates the reception processing.

A positioning processing executed by the server device 30 in the positioning system 1 according to the embodiment is described. FIG. 11 is a flowchart illustrating an example of the positioning processing executed by the server device 30 in the positioning system 1 according to the embodiment.

The communication controller 3001 determines whether or not the reception information is received (Act S21). If the reception information is not received (No in Act S21), the server device 30 stands by until the reception information is received.

On the other hand, if the reception information is received (Yes in Act S21), the positioning controller 3004 stores the received reception information in the measured value table 310 (Act S22).

The positioning controller 3004 selects the transmitter code from the measured value table 310 (Act S23). In particular, the positioning controller 3004 selects the transmitter code with the highest RSSI in each date and time in the measured value table 310 excluding the transmitter code transmitted from the transmitter 10 in the area division different from the location area of the route table 311.

The positioning controller 3004 extracts the measured method associated with the selected transmitter code from the positioning setting table 309 (Act S24).

The positioning controller 3004 determines whether or not the RSSI of the selected transmitter code is equal to or greater than the approach threshold value (Act S25).

If the RSSI is smaller than the approach threshold value (No in Act S25), the positioning controller 3004 selects the transmitter code with the number thereof corresponding to the measurement method (Act S26). The positioning controller 3004 measures the position of the receiver 20 according to the determined measurement method (Act S27).

On the other hand, if the RSSI is equal to or greater than the approach threshold value (Yes in Act S25), the positioning controller 3004 determines that there is the receiver 20 in the vicinity of the position of the transmitter 10 identified by the transmitter code with the highest RSSI (Act S28).

In this way, the server device 30 terminates the positioning processing.

As stated above, according to the positioning system 1 according to the present embodiment, the server device 30 determines that there is the receiver 20 at the same position as the transmitter 10 identified by the transmitter code if the RSSI of the transmitter code received by the receiver 20 is equal to or greater than the threshold value. Thus, the server device 30 can accurately measure the position.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

In the foregoing embodiment, the transmitter 10 is installed at the predetermined position. It is described that the receiver 20 moves by being carried by the user. However, which one of the transmitter 10 and the receiver 20 is fixed is optional. In other words, the receiver 20 may be installed at a predetermined position. The transmitter 10 may move by being carried by the user.

In the foregoing embodiment, functions of each device of the positioning system 1 are described. However, the assignment of the functions of the each device in the above embodiment is merely an example and may be other assignment. In other words, the receiver 20 or the server device 30 may have a part or all of the functions of the transmitter 10. Alternatively, the transmitter 10 or the server device 30 may have a part or all of the functions of the receiver 20. The transmitter 10 or the receiver 20 may have a part or all of the functions of the server device 30.

In the above embodiment, the case in which the information processing apparatus is applied to the server device 30 is described. However, the information processing apparatus may be the receiver 20 which is a smartphone or the like. If the transmitter 10 is a smartphone, the information processing apparatus may be the transmitter 10 which is the smartphone.

The programs executed by each device of the foregoing embodiment and the modification may be incorporated into a storage medium (ROM or storage section) of each device to be provided; however, the present invention is not limited to this. The programs may be recorded in a computer-readable recording medium such as a CD-ROM, a FD (Flexible Disk), a CD-R, a DVD (Digital Versatile Disk) and the like in the form of installable or executable file to be provided. Further, the storage medium is not limited to a medium independent from a computer or an embedded system and also contains a storage medium that stores or temporarily stores the programs by downloading the programs transmitted through a LAN or an Internet.

Further, the programs executed by each device of the foregoing embodiment and the modification is stored in a computer connected with a network and downloaded via the network to be supplied or may be supplied or distributed via the network such as the Internet.

What is claimed is:

1. An information processing apparatus, comprising:
a recording module configured to record radio wave intensities of a near distance radio communication between a plurality of first communication devices installed in an area for positioning an object and a second communication device moving in the area by each time zone;
an extraction module configured to extract a maximum radio wave intensity from the radio wave intensities recorded in the same time zone from a first communication device and to extract radio wave intensities of other first communication devices arranged in the vicinity of a position where the first communication device with the maximum radio wave intensity is installed;
a positioning module configured to measure a position of the second communication device based on the plurality of the radio wave intensities extracted by the extraction module; and
the positioning module further configured to determine that the second communication device is present at a position where the first communication device with the maximum radio wave intensity is installed on condition that the maximum radio wave intensity extracted by the extraction module is equal to or greater than a threshold value.

2. The information processing apparatus according to claim 1, wherein
the positioning module determines that the second communication device is present at a position where the first communication device with the maximum radio wave intensity is installed on condition that a ratio of the plurality of the radio wave intensities extracted by the extraction module is equal to or greater than a threshold value.

3. The information processing apparatus according to claim 1, wherein the recording module records a moving route of the second communication device by recording the position of the second communication device measured by the positioning module in a chronological order.

4. The information processing apparatus according to claim 2, wherein
the recording module records a moving route of the second communication device by recording the position of the second communication device measured by the positioning module in a chronological order.

5. The information processing apparatus according to claim 1, wherein
the extraction module extracts the radio wave intensity of the first communication device located in an area where the first communication device is not installed as the radio wave intensity of other first communication devices on condition that the radio wave intensity of the first communication device installed at a boundary part between areas in which the first communication device is installed as the maximum radio wave intensity.

6. The information processing apparatus according to claim 1, wherein
the plurality of first communication devices comprises at least two first communication devices.

7. The information processing apparatus according to claim 1, wherein
the plurality of first communication devices comprises at least three first communication devices.

8. A positioning system, comprising:
a recording module configured to record radio wave intensities of a near distance radio communication between a plurality of first communication devices installed in an area for positioning an object and a second communication device moving in the area by each time zone;
an extraction module configured to extract a maximum radio wave intensity from the radio wave intensities recorded in the same time zone from a first communication device and to extract the radio wave intensities of other first communication devices arranged in the vicinity of a position where the first communication device with the maximum radio wave intensity is installed;
a positioning module configured to measure a position of the second communication device based on the plurality of the radio wave intensities extracted by the extraction module; and
the positioning module further configured to determine that the second communication device is present at a position where the first communication device with the maximum radio wave intensity is arranged on condition that the maximum radio wave intensity extracted by the extraction module is equal to or greater than a threshold value.

9. The positioning system according to claim 8, wherein
the positioning module determines that the second communication device is present at a position where the first communication device with the maximum radio wave intensity is installed on condition that a ratio of the plurality of the radio wave intensities extracted by the extraction module is equal to or greater than a threshold value.

10. The positioning system according to claim 8, wherein
the recording module records a moving route of the second communication device by recording the position of the second communication device measured by the positioning module in a chronological order.

11. The positioning system according to claim 8, wherein
the extraction module extracts the radio wave intensity of the first communication device located in an area where the first communication device is not installed as the radio wave intensity of other first communication devices on condition that the radio wave intensity of the first communication device installed at a boundary part between areas in which the first communication device is installed as the maximum radio wave intensity.

12. The positioning system according to claim 8, wherein
the plurality of first communication devices comprises at least two first communication devices.

13. The positioning system according to claim 8, wherein
the plurality of first communication devices comprises at least three first communication devices.

14. A method for executing accurate positioning, including:
recording radio wave intensities of a near distance radio communication between a plurality of first communication devices installed in an area for positioning an object and a second communication device moving in the area by each time zone;
extracting a maximum radio wave intensity from the radio wave intensities recorded in the same time zone from a first communication device and extracting the radio wave intensities of other first communication devices arranged in the vicinity of a position where the first communication device with the maximum radio wave intensity extracted is installed;
measuring a position of the second communication device based on the plurality of the radio wave intensities; and
determining that the second communication device is present at a position where the first communication device with the maximum radio wave intensity is arranged on condition that the maximum radio wave intensity extracted is equal to or greater than a threshold value.

15. The method according to claim 14, further comprising:
determining that the second communication device is present at a position where the first communication device with the maximum radio wave intensity is installed on condition that a ratio of the plurality of the radio wave intensities extracted is equal to or greater than a threshold value.

16. The method according to claim 15, further comprising:
recording a moving route of the second communication device by recording the position of the second communication device measured in a chronological order.

17. The method according to claim 14, further comprising:
recording a moving route of the second communication device by recording the position of the second communication device measured in a chronological order.

18. The method according to claim 14, further comprising:
extracting the radio wave intensity of the first communication device located in an area where the first communication device is not installed as the radio wave intensity of other first communication devices on condition that the radio wave intensity of the first communication device installed at a boundary part between areas in which the first communication device is installed as the maximum radio wave intensity.

19. The method according to claim 14, wherein the plurality of first communication devices comprises at least two first communication devices.

20. The method according to claim 14, wherein the plurality of first communication devices comprises at least three first communication devices.

\* \* \* \* \*